United States Patent
Yang et al.

(10) Patent No.: US 10,662,005 B1
(45) Date of Patent: May 26, 2020

(54) TEMPORARY STORAGE AND SEPARATION DEVICE FOR WHEELS ON TRACK LINE AND WHEEL TRANSFER TRACK LINE

(71) Applicant: CITIC Dicastal CO., LTD., Qinhuangdao, Hebei (CN)

(72) Inventors: Jinling Yang, Qinhuangdao (CN); Li Yang, Qinhuangdao (CN); Zeyun Ma, Qinhuangdao (CN); Hongshen Zhang, Qinhuangdao (CN); Fengshan Qi, Qinhuangdao (CN); Lijun Zhang, Qinhuangdao (CN); Haibin Liu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 16/523,293

(22) Filed: Jul. 26, 2019

(30) Foreign Application Priority Data

Feb. 15, 2019 (CN) .......................... 2019 1 0117158

(51) Int. Cl.
| | |
|---|---|
| *B65G 47/88* | (2006.01) |
| *B65G 47/68* | (2006.01) |
| *B65G 47/30* | (2006.01) |
| *B65G 63/00* | (2006.01) |
| *B65G 1/04* | (2006.01) |

(52) U.S. Cl.
CPC ............ *B65G 63/002* (2013.01); *B65G 1/04* (2013.01); *B65G 47/30* (2013.01); *B65G 47/68* (2013.01); *B65G 47/88* (2013.01); *B65G 2201/0273* (2013.01); *B65H 2701/19* (2013.01)

(58) Field of Classification Search
CPC .... B65G 47/68; B65G 47/681; B65G 47/846; B65G 2201/0273; B65G 47/30; B65G 47/266; B65G 47/8823; B65G 47/88; B65G 63/002; B65G 1/04; B65H 2701/19
USPC ..... 198/444, 448, 449, 450, 451, 530, 459.7
See application file for complete search history.

(56) References Cited

U.S. PATENT DOCUMENTS

| | | | | |
|---|---|---|---|---|
| 1,852,034 | A | * 4/1932 | Twomley | B65G 47/681 198/368 |
| 2,341,705 | A | * 2/1944 | Fedorchak | B67C 3/007 198/459.7 |
| 3,850,281 | A | * 11/1974 | Focke | B65G 47/681 198/451 |
| 4,274,533 | A | * 6/1981 | Abe | B65G 47/846 198/447 |

(Continued)

*Primary Examiner* — James R Bidwell
(74) *Attorney, Agent, or Firm* — Syncoda LLC; Feng Ma

(57) ABSTRACT

A temporary storage and separation device for the wheels on the track line includes a main body bracket, a rotating mechanism, a turntable, a first connection rod, a second connection rod, a third connection rod, a fourth connection rod, a first blocking lever, a second blocking lever, a third blocking lever and a fourth blocking lever. The temporary storage and separation device for the wheels makes use of the turntable to drive the four blocking levers disposed at different positions to be extended or contracted to realize separation and temporary storage of the wheels in a transfer process; and meanwhile, photoelectric switches, reversible motors and a control unit cooperate with the temporary storage and separation device for the wheels to realize reversible transfer on the wheel transfer track line.

13 Claims, 4 Drawing Sheets

(56) References Cited

U.S. PATENT DOCUMENTS

| | | | | |
|---|---|---|---|---|
| 5,165,517 A | * | 11/1992 | Auld | B65G 47/681 |
| | | | | 198/450 |
| 5,501,522 A | * | 3/1996 | Tung | B01F 9/0001 |
| | | | | 366/149 |
| 5,582,283 A | * | 12/1996 | Arnarson | B65G 43/08 |
| | | | | 198/357 |
| 2012/0181145 A1 | * | 7/2012 | Rogers | B65G 47/22 |
| | | | | 198/340 |
| 2019/0161287 A1 | * | 5/2019 | Eckerstrom | B65G 47/681 |

* cited by examiner

TEMPORARY STORAGE AND SEPARATION DEVICE FOR WHEELS ON TRACK LINE AND WHEEL TRANSFER TRACK LINE

CROSS-REFERENCE TO RELATED APPLICATIONS

The present application claims benefit of Chinese Application No. 201910117158.X, filed on Feb. 15, 2019, the contents of which are hereby incorporated by reference in its entirety.

BACKGROUND

When a kind of wheel is produced in two automatic forging production lines for wheels, the same kind of wheels will flow from two tracks by a rear machine and one unit, but since front and rear automatic special machines have certain production cycles, a walking cycle of a wheel on the tracks is an important factor that affects the production of the wheel. Therefore, the production cycle of the wheel needs to be strictly controlled, or it will affect the production cycles and production efficiency of the front and the rear procedures. A measure of manually adjusting the rhythm on a production track is generally adopted in order to not affect the production cycles of special machines for the front and rear procedures, which causes high labor intensity.

SUMMARY

The present disclosure relates to the technical field of transportation devices on an automatic production line, and more particularly relates to a temporary storage and separation device for wheels on a track line and a wheel transfer track line.

The embodiment of the present disclosure provides a temporary storage and separation device for wheels on a track line and a wheel transfer track line, which may realize control of separation and temporary storage of wheels and reversible transfer on the wheel transfer track line and also may adjust separation time and temporary storage time to adapt to subsequent production cycles or production efficiency, reduce the labor intensity of a worker, stabilize the rhythm of production and improve the production efficiency.

On the first aspect, a temporary storage and separation device for wheels on a track line is provided, including a main body bracket, a rotating mechanism, a turntable, a first connection rod, a second connection rod, a third connection rod, a fourth connection rod, a first blocking lever, a second blocking lever, a third blocking lever and a fourth blocking lever. The rotating mechanism is mounted on the main body bracket. The upper surface of the turntable is a horizontal plane. The turntable is connected with the rotating mechanism and may clockwise and counterclockwise rotate with the rotating mechanism. The upper surface of the turntable is movably connected with the first connection rod, the second connection rod, the third connection rod and the fourth connection rod. The first connection rod is movably connected with the first blocking lever. The second connection rod is movably connected with the second blocking lever. The third connection rod is movably connected with the third blocking lever. The fourth connection rod is movably connected with the fourth blocking lever. Positions, movably connected with the upper surface of the turntable, of the first connection rod and the fourth connection rod are located on a straight line passing through the center of a disc, and positions, movably connected with the upper surface of the turntable, of the second connection rod and the third connection rod are located on another straight line passing through the center of the disc. The rotating mechanism may be provided with two target positions. The rotating mechanism rotates clockwise from the first target position to the second target position, and then rotates counterclockwise from the second target position to the first target position, and the rotating mechanism does a reciprocating motion between the two target positions. When the upper surface of the turntable rotates clockwise with the rotating mechanism to the first target position, the first blocking lever and the fourth blocking lever are contracted to cause the wheel to move forwards, and the second blocking lever and the third blocking lever are extended to block the wheel. When the upper surface of the turntable rotates counterclockwise with the rotating mechanism to the second target position, the second blocking lever and the third blocking lever are contracted to cause the wheel to move forwards, and the first blocking lever and the fourth blocking lever are extended to block the wheel.

In an embodiment, the rotating mechanism includes a rotary power component, a rotating shaft, a bearing and a bearing support. The rotary power component is fixed on the main body bracket, and an output shaft of the rotary power component is fixedly connected with the rotating shaft. The rotating shaft is fixedly connected with the turntable, and the rotating shaft drives the turntable to rotate. The rotating shaft is disposed in the bearing, and the bearing is mounted on the bearing support. The bearing support is fixed on the main body bracket. The rotary power component may be a corner cylinder, a rotary cylinder or a rotary hydraulic cylinder. In this way, the speed and angle of rotation may be adjusted, so that the separation time or temporary storage time of the temporary storage and separation device for the wheels may be adjusted to adapt to the subsequent production cycles and production efficiency.

In an embodiment, the first connection rod, the second connection rod, the third connection rod and the fourth connection rod are connected to the upper surface of the turntable through first hinges, and the first blocking lever, the second blocking lever, the third blocking lever and the fourth blocking lever are respectively connected to the first connection rod, the second connection rod, the third connection rod and the fourth connection rod through second hinges.

In an embodiment, the position, movably connected with the upper surface of the turntable, of the first connection rod and the position, movably connected with the upper surface of the turntable, of the third connection rod are close, and the position, movably connected with the upper surface of the turntable, of the second connection rod and the position, movably connected with the upper surface of the turntable, of the fourth connection rod are close. With such a small angle of rotation, the connection rods may move a relatively large distance.

In an embodiment, the main body bracket includes a left side panel, a right side panel, a middle supporting plate and a top panel. The left side panel and the right side panel are respectively fixed on the left and right sides of the middle supporting plate and the top panel. The rotating mechanism is fixed on the middle supporting plate. A circular hole is formed in the middle part of the top panel. The turntable is disposed in the circular hole formed in the middle part of the top panel. In this way, the first blocking lever, the second blocking lever, the third blocking lever and the fourth blocking lever may be supported by the top panel to make the structure more stable.

On the second aspect, the embodiment of the present disclosure provides a wheel transfer track line, including the aforementioned temporary storage and separation device for the wheels on the track line, and also including tracks and track supporting frames which are located on the left and right sides of the main body bracket. The tracks are located on the track supporting frames. The first blocking lever, the second blocking lever, the third blocking lever and the fourth blocking lever may be extended onto the tracks to block the wheels.

In an embodiment, the wheel transfer track line also includes a control unit and a plurality of photoelectric switches uniformly distributed along the track supporting frames. Reversible motors are disposed in the tracks. The photoelectric switches and the reversible motors are all connected with the control unit in a signal manner. Through the arrangement of the photoelectric switches, the reversible motors and the control unit, one front wheel of one track may be dispersed into the other track, thereby realizing control of reversibility, separation, temporary storage and forwarding of the wheels.

Compared with the prior art, the present disclosure has the beneficial effects that:

the present disclosure provides the temporary storage and separation device for the wheels on the track line; the turntable is used to drive the first blocking lever, the second blocking lever, the third blocking lever and the fourth blocking lever which are disposed at different positions to be extended or contracted to realize separation and temporary storage of the wheels in a transfer process; meanwhile, the photoelectric switches, the reversible motors and the control unit cooperate with the temporary storage and separation device for the wheels to realize reversible transfer on the wheel transfer track line, that is, one front wheel in one track is dispersed into the other track; the temporary storage and separation device for the wheels and the wheel transfer track line may adjust the separation time and temporary storage time to adapt to the subsequent production cycles or production efficiency, increase the automation degree of production, reduce the labor intensity of a worker, and stabilize the rhythm of production and improve the production efficiency.

Figure 1:
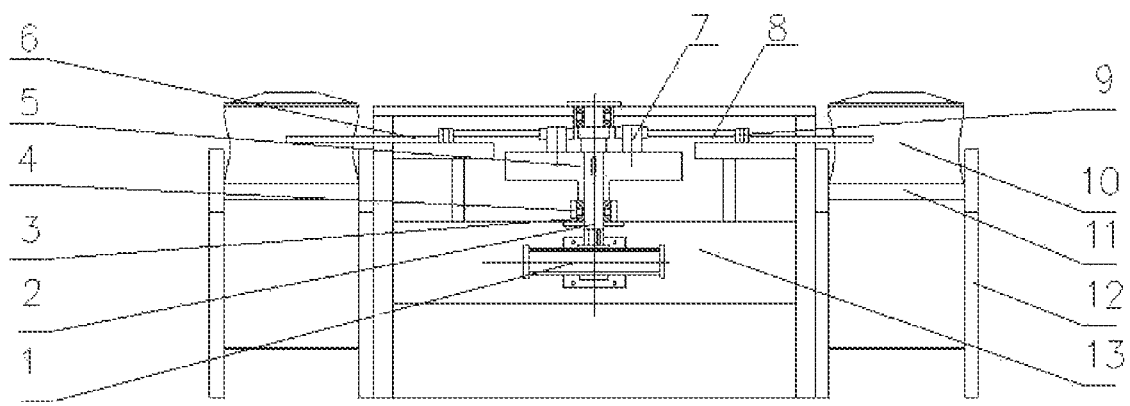
FIG. 1 is a structural schematic diagram I of a temporary storage and separation device for wheels on a track line according to the present disclosure.
Figure 2:
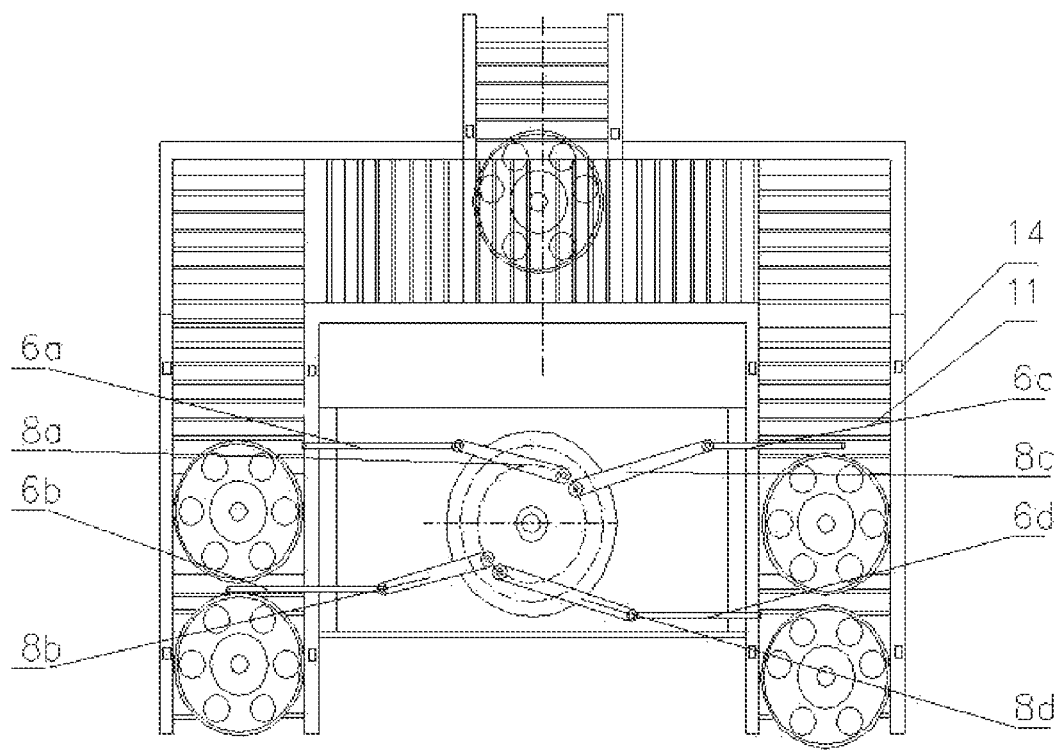
FIG. 2 is a structural schematic diagram II of the temporary storage and separation device for wheels on the track line according to the present disclosure.

In the drawings, 1: corner cylinder; 2: rotating shaft; 3: bearing; 4: bearing support; 5: turntable; 6: blocking lever; 6a: first blocking lever; 6b: second blocking lever; 6c: third blocking lever; 6d: fourth blocking lever; 7: first hinge; 8: connection rod; 8a: first connection rod; 8b: second connection rod; 8c: third connection rod; 8d: fourth connection rod; 9: second hinge; 10: wheel; 11: track; 12: track supporting frame; 13: main body bracket; and 14: photoelectric switch.

DETAILED DESCRIPTION

Embodiment 1 of the Present Disclosure is Described with Reference to FIGS. 1 to 4

A temporary storage and separation device for wheels on a track line includes a main body bracket 13, a rotating mechanism, a turntable 5, a first connection rod 8a, a second connection rod 8b, a third connection rod 8c, a fourth connection rod 8d, a first blocking lever 6a, a second blocking lever 6b, a third blocking lever 6c and a fourth blocking lever 6d. The rotating mechanism is mounted on the main body bracket 13. The main body bracket is placed on the ground. The upper surface of the turntable 5 is a horizontal plane. The turntable 5 is connected with the rotating mechanism and may clockwise and counterclockwise rotate with the rotating mechanism. The rotating mechanism includes a corner cylinder 1, a rotating shaft 2, a bearing 3 and a bearing support 4. The corner cylinder 1 is fixed on the main body bracket 13, and an output shaft of the corner cylinder 1 is fixedly connected with the rotating shaft 2. The rotating shaft 2 is fixedly connected with the turntable 5, and the rotating shaft 2 drives the turntable 5 to rotate. The rotating shaft 2 is disposed in the bearing 3, and the bearing 3 is mounted on the bearing support 4. The bearing support 4 is fixed on the main body bracket 13. The main body bracket 13 includes a left side panel, a right side panel, a middle supporting plate and a top panel. The left side panel and the right side panel are respectively fixed on the left and right sides of the middle supporting plate and the top panel. The corner cylinder 1 is fixed on the middle supporting plate of the main body bracket 13. The bearing support 4 is fixed on the middle supporting plate of the main body bracket 13. A circular hole is formed in the middle part of the top panel. The turntable 5 is disposed in the circular hole formed in the middle part of the top panel. The first connection rod 8a, the second connection rod 8b, the third connection rod 8c and the fourth connection rod 8d are connected to the upper surface of the turntable 5 through first hinges 7, and the first blocking lever 6a, the second blocking lever 6b, the third blocking lever 6c and the fourth blocking lever 6d are respectively connected to the first connection rod 8a, the second connection rod 8b, the third connection rod 8c and the fourth connection rod 8d through second hinges 9. Positions, movably connected with the upper surface of the turntable, of the first connection rod 8a and the fourth connection rod 8d are located on a straight line passing through the center of a disc, and positions, movably connected with the upper surface of the turntable, of the second connection rod 8b and the third connection rod 8c are located on another straight line passing through the center of the disc. The position, movably connected with the upper surface of the turntable 5, of the first connection rod 8a and the position, movably connected with the upper surface of the turntable 5, of the third connection rod 8c are close, and the position, movably connected with the upper surface of the turntable 5, of the second connection rod 8b and the position, movably connected with the upper surface of the turntable 5, of the fourth connection rod 8d are close.

The corner cylinder 1 is a corner cylinder most commonly used by those skilled in the art and capable of rotating by 90 degrees. That is, the corner cylinder may be provided with two target positions forming an included angle of 90 degrees. The rotating mechanism rotates 90 degrees clockwise from the first target position to the second target position, and then rotates 90 degrees counterclockwise from the second target position to the first target position, and the rotating mechanism does a reciprocating motion between the two target positions. When the upper surface of the turntable 5 rotates 90 degrees clockwise with the corner cylinder 1 from the first target position to the second target position, the first blocking lever 6a and the fourth blocking lever 6d are contracted to cause the wheel to move forwards, and the second blocking lever 6b and the third blocking lever 6c are extended to block the wheel. When the upper surface of the turntable 5 rotates 90 degrees counterclockwise with the corner cylinder 1 from the second target position to the first target position, the second blocking lever 6b and the third blocking lever 6c are contracted to cause the wheel to move forwards, and the first blocking lever 6a and the fourth blocking lever 6d are extended to block the wheel. Since the corner cylinder may be manually adjusted in speed and angle of rotation, the separation time or temporary storage time of the temporary storage and separation device for the wheels may be adjusted to adapt to the subsequent production cycles and production efficiency, increase the automation degree of production, reduce the labor intensity of a worker, and stabilize the rhythm of production and improve the production efficiency.

In addition, in some other embodiments, the corner cylinder 1 may be replaced by a rotary cylinder or a rotary hydraulic cylinder and the same effects can be achieved.

Embodiment 2 of the Present Disclosure

A wheel transfer track line includes the temporary storage and separation device for the wheels on the track line in Embodiment 1, and also includes tracks and track supporting frames which are located on the left and right sides of the main body bracket 13, a control unit and a plurality of photoelectric switches 14 uniformly distributed along the track supporting frames 12. The tracks 11 are located on the track supporting frames 12. The first blocking lever 6a, the second blocking lever 6b, the third blocking lever 6c and the fourth blocking lever 6d may be extended onto the tracks 11 on the left and right sides of the main body bracket 13 to block the wheel. Reversible motors are disposed in the tracks. The photoelectric switches 14 and the reversible motors are all connected with the control unit in a signal manner.

Figure 3:
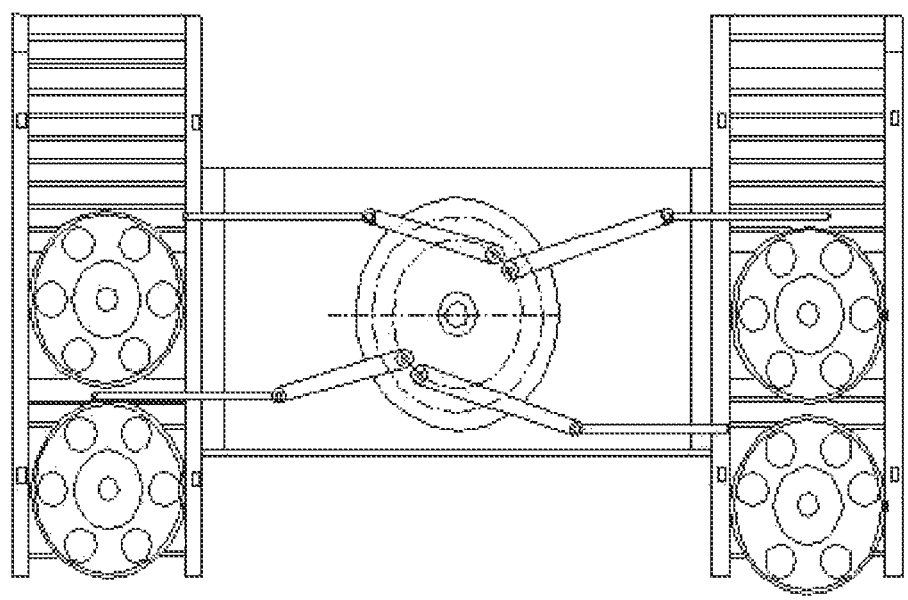
FIG. 3 is a schematic diagram of clockwise rotation of a turntable.

Specific wheel transfer steps on the wheel transfer track line are as follows:

In step I, as shown in FIG. 3, on the wheel transfer track line, the wheel 10 comes from the two tracks 11, and the corner cylinder 1 acts to drive the turntable 5 to rotate 90 degrees clockwise so as to drive the third connection rod 8c through the first hinge 7 and the third blocking lever 6c through the second hinge 9 to be extended out of a slot of the main body bracket 13 and to drive the second connection rod 8b through the first hinge 7 and the second blocking lever 6b through the second hinge 9 to be extended out of a slot of the main body bracket 13, and so as to drive the first connection rod 8a through the first hinge 7 and the first blocking lever 6a through the second hinge 9 to be contracted in a slot of the main body bracket 13 and to drive the fourth connection rod 8d through the first hinge 7 and the fourth blocking lever 6d through the second hinge 9 to be contracted in a slot of the main body bracket 13. In this way, one front wheel on the left track may move forward with the track, and one rear wheel on the left side is blocked by the second blocking lever 6b. The blocking lever blocks the wheel on the right track, so that the wheel on the right track is temporarily stored. Meanwhile, the connection rods and the blocking levers also may play a role of separating the front and rear wheels on the same track.

Figure 4:
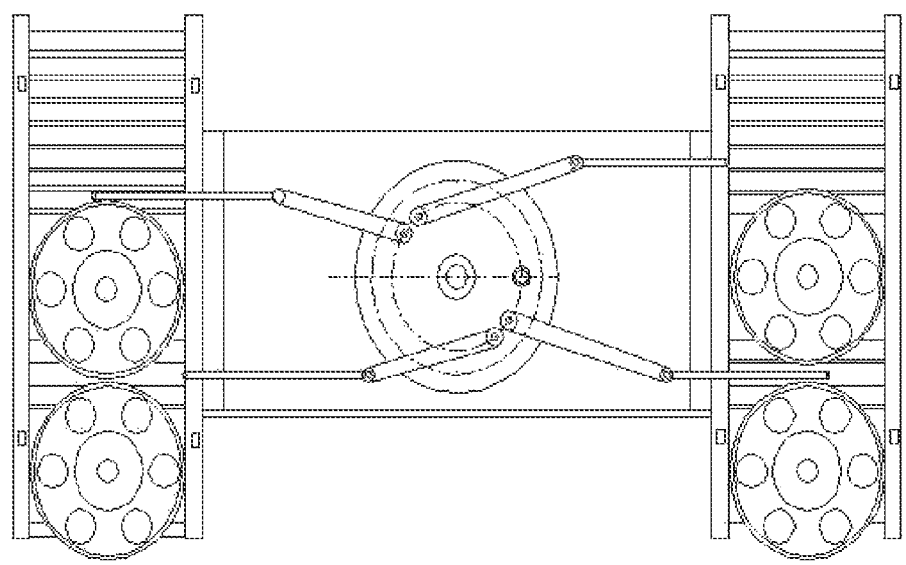
FIG. 4 is a schematic diagram of counterclockwise rotation of the turntable.

In step II, as shown in FIG. 4, then the corner cylinder 1 acts to drive the turntable 5 to rotate 90 degrees counterclockwise so as to drive the first connection rod 8a through the first hinge 7 and the first blocking lever 6a through the second hinge 9 to be extended out of the slot of the main body bracket 13 and to drive the fourth connection rod 8d through the first hinge 7 and the fourth blocking lever 6d through the second hinge 9 to be extended out of the slot of the main body bracket 13, and so as to drive the third connection rod 8c through the first hinge 7 and the third blocking lever 6c through the second hinge 9 to be contracted in the slot of the main body bracket 13 and to drive the second connection rod 8b through the first hinge 7 and the second blocking lever 6b through the second hinge 9 to be contracted in the slot of the main body bracket 13. The front wheel that is previously blocked by the third blocking lever 6c on the right track may move forwards, and the rear wheel on the right track is blocked by the fourth blocking lever 6d; the previously blocked rear wheel on the left track is blocked by the first blocking lever 6a after making one step forward, and the subsequent wheel on the left track is also temporarily stored after making one step forward. Meanwhile, the connection rods and the blocking levers also may play a role of separating the front and rear wheels on the same track.

In step III, on the wheel transfer track line, the corner cylinder 1 acts to drive the turntable 5 to rotate 90 degrees clockwise, so as to drive the third connection rod 8c through the first hinge 7 and the third blocking lever 6c through the second hinge 9 to be extended out of the slot of the main body bracket 13 and to drive the second connection rod 8b through the first hinge 7 and the second blocking lever 6b through the second hinge 9 to be extended out of the slot of the main body bracket 13, and so as to drive the first connection rod 8a through the first hinge 7 and the first blocking lever 6a through the second hinge 9 to be contracted in the slot of the main body bracket 13 and to drive the fourth connection rod 8d through the first hinge 7 and the fourth blocking lever 6d through the second hinge 9 to be contracted in the slot of the main body bracket 13. In this way, one front wheel on the left side of the track may move forwards with the track, and one rear wheel on the left side is blocked by the second blocking lever 6b; the previously blocked rear wheel on the right track is blocked by the third blocking lever 6c after making one step forward, and the subsequent wheel on the right track is also temporarily stored after making one step forward. Meanwhile, the connection rods and the blocking levers also may play a role of separating the front and rear wheels on the same track. Then Step II is continued cyclically.

In addition, the speed and angle of rotation of the corner cylinder may be adjusted according to the requirements of the subsequent production cycles or production efficiency, thereby adjusting the separation time or temporary storage time of the temporary storage and separation device for the wheels to adapt to the subsequent production cycles and production efficiency, increase the automation degree of production, reduce the labor intensity of the worker, and stabilize the rhythm of production and improve the production efficiency.

In addition, in the present embodiment, the plurality of photoelectric switches 14 are uniformly distributed along the track supporting frames 12, and the reversible motors are disposed in the tracks. The photoelectric switches 14 and the reversible motors are all connected with the control unit in a signal manner. The positions of the wheels in the tracks may be determined through the photoelectric switches 14, thereby ensuring that only one front wheel in the two tracks may move forwards. The photoelectric switches 14 cooperate with the control unit to control the reversible motors in the tracks to disperse one front wheel in one track into the other track to realize reversible transfer operation of the wheel.

To summarize, the application provides the temporary storage and separation device for the wheels on the track line; the turntable is used to drive the first blocking lever, the second blocking lever, the third blocking lever and the fourth blocking lever which are disposed at different positions to be extended or contracted to realize separation and temporary storage of the wheels in a transfer process; meanwhile, the photoelectric switches, the reversible motors and the control unit cooperate with the temporary storage and separation device for the wheels to realize reversible transfer on the wheel transfer track line, that is, one front wheel in one track is dispersed into the other track; the temporary storage and separation device for the wheels and the wheel transfer track line may adjust the separation time and temporary storage time to adapt to the subsequent production cycles or production efficiency, increase the automation degree of production, reduce the labor intensity of a worker, and stabilize the rhythm of production and improve the production efficiency.

The invention claimed is:

1. A temporary storage and separation device for wheels on a track line, comprising a main body bracket, a rotating mechanism, a turntable, a first connection rod, a second connection rod, a third connection rod, a fourth connection rod, a first blocking lever, a second blocking lever, a third blocking lever and a fourth blocking lever, wherein the rotating mechanism is mounted on the main body bracket; an upper surface of the turntable is a horizontal plane; the turntable is connected with the rotating mechanism and is capable of clockwise and counterclockwise rotating with the rotating mechanism; the upper surface of the turntable is movably connected with the first connection rod, the second connection rod, the third connection rod and the fourth connection rod; the first connection rod is movably connected with the first blocking lever; the second connection rod is movably connected with the second blocking lever; the third connection rod is movably connected with the third blocking lever; the fourth connection rod is movably connected with the fourth blocking lever; positions, movably connected with the upper surface of the turntable, of the first connection rod and the fourth connection rod are located on a straight line passing through a center of a disc, and positions, movably connected with the upper surface of the turntable, of the second connection rod and the third connection rod are located on another straight line passing through the center of the disc;

the rotating mechanism is capable to be provided with two target positions; the rotating mechanism rotates clockwise from a first target position to a second target position, and then rotates counterclockwise from the second target position to the first target position, and the rotating mechanism does a reciprocating motion between the two target positions; when the upper surface of the turntable rotates clockwise with the rotating mechanism to the first target position, the first blocking lever and the fourth blocking lever are contracted to cause the wheel to move forwards, and the second blocking lever and the third blocking lever are extended to block the wheel; and when the upper surface of the turntable rotates counterclockwise with the rotating mechanism to the second target position, the second blocking lever and the third blocking lever are contracted to cause the wheel to move forwards, and the first blocking lever and the fourth blocking lever are extended to block the wheel.

2. The temporary storage and separation device for wheels on the track line according to claim 1, wherein the rotating mechanism comprises a rotary power component, a rotating shaft, a bearing and a bearing support; the rotary power component is fixed on the main body bracket, and an output shaft of the rotary power component is fixedly connected with the rotating shaft; the rotating shaft is fixedly connected with the turntable, and the rotating shaft drives the turntable to rotate; the rotating shaft is disposed in the bearing; the bearing is mounted on the bearing support; and the bearing support is fixed on the main body bracket.

3. The temporary storage and separation device for wheels on the track line according to claim 2, wherein the rotary power component is a corner cylinder, a rotary cylinder or a rotary hydraulic cylinder.

4. The temporary storage and separation device for wheels on the track line according to claim 1, wherein the first connection rod, the second connection rod, the third connection rod and the fourth connection rod are connected to the upper surface of the turntable through first hinges, and the first blocking lever, the second blocking lever, the third blocking lever and the fourth blocking lever are respectively connected to the first connection rod, the second connection rod, the third connection rod and the fourth connection rod through second hinges.

5. The temporary storage and separation device for wheels on the track line according to claim 1, wherein a position, movably connected with the upper surface of the turntable, of the first connection rod and a position, movably connected with the upper surface of the turntable, of the third connection rod are close, and a position, movably connected with the upper surface of the turntable, of the second connection rod and a position, movably connected with the upper surface of the turntable, of the fourth connection rod are close.

6. The temporary storage and separation device for wheels on the track line according to claim 1, wherein the main body bracket comprises a left side panel, a right side panel, a middle supporting plate and a top panel; the left side panel and the right side panel are respectively fixed on left and right sides of the middle supporting plate and the top panel; the rotating mechanism is fixed on the middle supporting plate; a circular hole is formed in a middle part of the top panel; and the turntable is disposed in the circular hole formed in the middle part of the top panel.

7. A wheel transfer track line, comprising a temporary storage and separation device for wheels on a track line, the temporary storage and separation device for wheels on the track line comprises a main body bracket, a rotating mechanism, a turntable, a first connection rod, a second connection rod, a third connection rod, a fourth connection rod, a first blocking lever, a second blocking lever, a third blocking lever and a fourth blocking lever, the rotating mechanism is mounted on the main body bracket; an upper surface of the turntable is a horizontal plane; the turntable is connected with the rotating mechanism and is capable of clockwise and counterclockwise rotating with the rotating mechanism; the upper surface of the turntable is movably connected with the first connection rod, the second connection rod, the third connection rod and the fourth connection rod; the first connection rod is movably connected with the first blocking lever; the second connection rod is movably connected with the second blocking lever; the third connection rod is movably connected with the third blocking lever; the fourth connection rod is movably connected with the fourth blocking lever; positions, movably connected with the upper surface of the turntable, of the first connection rod and the fourth connection rod are located on a straight line passing through a center of a disc, and positions, movably connected with the upper surface of the turntable, of the second connection rod and the third connection rod are located on another straight line passing through the center of the disc;

the rotating mechanism is capable to be provided with two target positions; the rotating mechanism rotates clockwise from a first target position to a second target position, and then rotates counterclockwise from the second target position to the first target position, and the rotating mechanism does a reciprocating motion between the two target positions; when the upper surface of the turntable rotates clockwise with the rotating mechanism to the first target position, the first blocking lever and the fourth blocking lever are contracted to cause the wheel to move forwards, and the second blocking lever and the third blocking lever are extended to block the wheel; and when the upper surface of the turntable rotates counterclockwise with the rotating mechanism to the second target position, the second blocking lever and the third blocking lever are contracted to cause the wheel to move forwards, and the first blocking lever and the fourth blocking lever are extended to block the wheel;

the wheel transfer track line also comprises tracks and track supporting frames which are located on left and right sides of the main body bracket, wherein the tracks are located on the track supporting frames; and the first blocking lever, the second blocking lever, the third blocking lever and the fourth blocking lever are capable to be extended onto the tracks on the left and right sides of the main body bracket to block the wheels.

8. The wheel transfer track line according to claim 7, also comprising a control unit and a plurality of photoelectric switches uniformly distributed along the track supporting frames, wherein reversible motors are disposed in the tracks; and the photoelectric switches and the reversible motors are all connected with the control unit in a signal manner.

9. The wheel transfer track line according to claim 7, wherein the rotating mechanism comprises a rotary power component, a rotating shaft, a bearing and a bearing support; the rotary power component is fixed on the main body bracket, and an output shaft of the rotary power component is fixedly connected with the rotating shaft; the rotating shaft is fixedly connected with the turntable, and the rotating shaft drives the turntable to rotate; the rotating shaft is disposed in the bearing; the bearing is mounted on the bearing support; and the bearing support is fixed on the main body bracket.

10. The wheel transfer track line according to claim 9, wherein the rotary power component is a corner cylinder, a rotary cylinder or a rotary hydraulic cylinder.

11. The wheel transfer track line according to claim 7, wherein the first connection rod, the second connection rod, the third connection rod and the fourth connection rod are connected to the upper surface of the turntable through first hinges, and the first blocking lever, the second blocking lever, the third blocking lever and the fourth blocking lever are respectively connected to the first connection rod, the second connection rod, the third connection rod and the fourth connection rod through second hinges.

12. The wheel transfer track line according to claim 7, wherein a position, movably connected with the upper surface of the turntable, of the first connection rod and a position, movably connected with the upper surface of the turntable, of the third connection rod are close, and a position, movably connected with the upper surface of the turntable, of the second connection rod and a position, movably connected with the upper surface of the turntable, of the fourth connection rod are close.

13. The wheel transfer track line according to claim 7, wherein the main body bracket comprises a left side panel, a right side panel, a middle supporting plate and a top panel; the left side panel and the right side panel are respectively fixed on left and right sides of the middle supporting plate and the top panel; the rotating mechanism is fixed on the middle supporting plate; a circular hole is formed in a middle part of the top panel; and the turntable is disposed in the circular hole formed in the middle part of the top panel.

\* \* \* \* \*